(12) United States Patent
Hung

(10) Patent No.: US 8,094,251 B2
(45) Date of Patent: Jan. 10, 2012

(54) METHOD FOR MANUFACTURING LOWER SUBSTRATE OF LIQUID CRYSTAL DISPLAY DEVICE

(75) Inventor: Meng-Yi Hung, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 125 days.

(21) Appl. No.: 12/726,398

(22) Filed: Mar. 18, 2010

(65) Prior Publication Data

US 2010/0173489 A1    Jul. 8, 2010

Related U.S. Application Data

(62) Division of application No. 11/639,266, filed on Dec. 15, 2006, now Pat. No. 7,710,507.

(30) Foreign Application Priority Data

Apr. 7, 2006 (TW) .............................. 95112338 A

(51) Int. Cl.
*G02F 1/136* (2006.01)
*G02F 1/1343* (2006.01)
*G02F 1/13* (2006.01)

(52) U.S. Cl. ............. 349/43; 349/42; 349/139; 349/187
(58) Field of Classification Search .............. 349/38–43; 430/312, 318
See application file for complete search history.

(56) References Cited

U.S. PATENT DOCUMENTS

| | | | |
|---|---|---|---|
| 5,663,020 A * | 9/1997 | Yamaue et al. | ................. 430/20 |
| 6,326,129 B1 | 12/2001 | Hirose et al. | |
| 6,567,135 B1 * | 5/2003 | Park | ................................ 349/42 |

* cited by examiner

*Primary Examiner* — Dung T. Nguyen
(74) *Attorney, Agent, or Firm* — Bacon & Thomas, PLLC

(57) ABSTRACT

A method for manufacturing a lower substrate of a liquid crystal display device is disclosed. The method comprises the steps of: (a) forming a patterned first metal layer, a first insulating layer, a patterned second metal layer and a second insulating layer on a substrate in sequence; (b) coating a transparent electrode layer and a negative photo resist layer on the second insulating layer; (c) irradiating the photo resist layer from the second surface of the substrate; (d) irradiating the photo resist layer from the first surface of the substrate, wherein part of the photo resist layer superposed over the second metal layer is covered by a mask; and (e) removing un-reacted photo resist and patterning the transparent electrode.

6 Claims, 6 Drawing Sheets

METHOD FOR MANUFACTURING LOWER SUBSTRATE OF LIQUID CRYSTAL DISPLAY DEVICE

This application is a divisional application of pending U.S. patent application Ser. No. 11/639,266, filed Dec. 15, 2006 (of which the entire disclosure of the pending, prior application is hereby incorporated by reference).

BACKGROUND OF THE INVENTION

1. Field of the Invention

The present invention relates to a method for manufacturing a lower substrate of a liquid crystal display (LCD) device and, more particularly, to a method for manufacturing a lower substrate of an LCD device with high accuracy of alignment.

2. Description of Related Art

Currently, the LCD devices can be classified into two major categories, i.e., the passive matrix LCD (PMLCD) devices and the active matrix LCD (AMLCD) devices according to the driving method. The active matrix LCD device is a kind of display devices that utilize thin film transistors (TFT) as switching elements. Generally, the aperture ratio of a single pixel in the AMLCD device directly relates to the light quantity passing through transparent areas from back light modules. For the AMLCD devices having the same power consumption, the higher aperture ratio means the better brightness of AMLCD devices.

The designs of the high aperture ratios of the LCD devices are achieved by overlapping the periphery of the pixel electrode and the non-transparent conductive line, since the randomly aligned liquid crystal molecules form a light-leaking area between pixel electrodes could be shielded by non-transparent conductive signal line. However, because the alignment between the pixel electrode and the non-transparent conductive line is not accurate in practice, the resulting alignment shift usually causes the capacitance variance. Hence, the display quality is further deteriorated.

FIG. 1 (a) is a top view of the pixel area of the conventional LCD. In order to get high aperture radio, a transparent electrode 100 is arranged to partially overlap the conductive line. However, due to the limit of the resolution of pixel electrode masks, the alignment accuracy among layers, and the variation of side etching, the width of the conductive lines cannot be too narrow or otherwise the light leakage occurs. FIG. 1 (b) is a cross-section view of the line A-A' in FIG. 1 (a). When the alignment between the transparent electrode layer 100 and the conductive line (i.e., the second metal layer 300) shifts, the shift will cause more variance in horizontal or vertical direction and result in inconsistent overlapping for layers. The inconsistent overlapping further causes various values of unexpected parasitic capacitance 400 and 401, and induces an unstable total parasitic capacitance. Thus the consistency of the display quality will be affected.

SUMMARY OF THE INVENTION

The method for manufacturing a lower substrate of an LCD device of the present invention is applied with a mask and is illuminated from the backside of the substrate to form patterned pixel electrodes. Through the method of the present invention, superimposition between the transparent pixel electrode and the signal line is constant. Hence, there is no alignment shift between layers, and display stability can be enhanced.

Through the method for manufacturing a lower substrate of an LCD device of the present invention, the width of signal lines is adjusted without adjusting the limit of the alignment precision between the transparent electrode layer and the conductive signal line, or the resolution of the mask. Hence, a high aperture ratio can be obtained.

One object of the present invention is to provide a method for manufacturing a lower substrate of an LCD device, which includes the following steps: (a) forming a patterned first metal layer, a first insulation layer, a patterned second metal layer, and a second insulation layer on a first surface of a substrate, wherein the first metal layer is covered by the first insulation layer, the second metal layer locates on the first insulation layer, and the second metal layer is covered by the second insulation layer; (b) forming a transparent electrode layer and a negative photoresist layer on the second insulation layer, wherein the transparent electrode layer locates between the second insulation layer and the negative photoresist; (c) illuminating the substrate from a second surface of the substrate, wherein the second surface is opposing to the first surface of the substrate; (d) exposing the substrate from the first surface by applying a mask above the negative photoresist; and (e) removing the non-reacted negative photoresist, and forming a patterned transparent electrode through etching.

In one embodiment of the present invention, the above-mentioned method further comprises a step (f) of removing all the negative photoresist after the step (e). In step (a), the first metal layer is preferred to be a gate metal layer or a gate conductive layer. In the present embodiment, materials of the first metal layer and the second metal layer are, but not limited, preferable to be non-transparent metal materials.

In another embodiment of the present invention, the method for manufacturing a lower substrate of an LCD device includes the following steps: (a) forming a patterned first metal layer, a first insulation layer, a patterned second metal layer, and a second insulation layer on a first surface of a substrate, wherein the first metal layer is covered by the first insulation layer, the second metal layer locates on the first insulation layer, and the second metal layer is covered by the second insulation layer; (b) forming a positive photoresist layer on the second insulation layer; (c) illuminating the substrate from a second surface of the substrate, wherein the second surface is opposing to the first surface of the substrate; (d) exposing the substrate from the first surface by applying a mask above the positive photoresist on the second insulation layer; (e) removing the reacted positive photoresist; (f) forming a transparent electrode layer on the second insulation layer and the residual positive photoresist; and (g) stripping the residual positive photoresist, and removing the transparent electrode layer on the residual positive photoresist.

In the present method, preferably, the first metal layer in step (a) is a gate metal layer, or a conductive layer.

According to another embodiment of the present invention, the method for manufacturing a lower substrate of a liquid crystal display device includes the following steps: (a) forming a patterned first transparent electrode layer, a first insulation layer, a patterned metal layer, and a second insulation layer on a first surface of a substrate, wherein the first transparent layer is covered by the first insulation layer, the metal layer locates on the first insulation layer, and the metal layer is covered by the second insulation layer; (b) forming a second transparent electrode layer and a negative photoresist layer on the second insulation layer, wherein the second transparent electrode layer locates between the second insulation layer and the negative photoresist; (c) illuminating the substrate from a second surface of the substrate, wherein the second surface is opposing to the first surface of the substrate;

and (d) removing the non-reacted negative photoresist, and forming a patterned second transparent electrode through etching.

The above-mentioned method preferably comprises a step (e) of removing all the negative photoresist after the step (d) so as to get a more completely patterned second transparent electrode.

Another object of the present invention is to provide a method for manufacturing a lower substrate of a liquid crystal display device, comprising the following steps of: (a) forming a patterned first conductive layer, a first insulation layer, a patterned metal layer, and a second insulation layer on a first surface of a substrate, wherein the first conductive layer is covered by the first insulation layer, the metal layer locates on the first insulation layer, and the metal layer is covered by the second insulation layer; (b) forming a transparent electrode layer and a negative photoresist layer on the second insulation layer, wherein the transparent electrode layer locates between the second insulation layer and the negative photoresist; (c) illuminating the substrate from a second surface of the substrate, wherein the second surface is opposing to the first surface of the substrate; and (d) removing the non-reacted negative photoresist, and forming a patterned second transparent electrode through etching.

In one embodiment of the present invention, the method further comprises a step (e) of removing all the negative photoresist after the step (d) so as to get a more completely patterned second transparent electrode. In the method of the present invention, the first conductive layer is a non-transparent or semi-transparent material, and preferably in a form of grating. By illuminating from the backside of the substrate, the photoresist above the first conductive layer is retained to form a complete transparent electrode.

According to the present invention, the insulation layer can be organic materials (e.g., acrylic resin, and polyimide resin; or inorganic materials like $SiO_2$, and $SiN_x$ etc.), or any suitable insulating material. Preferably, the second insulation layer is a planarizing layer.

Moreover, in the method described above, the transparent electrode layer can be indium tin oxide (ITO), indium zinc oxide (IZO), or any suitable material. In the present method, the transparent electrode can be formed by sputtering or any suitable method.

Other objects, advantages, and novel features of the invention will become more apparent from the following detailed description when taken in conjunction with the accompanying drawings.

DETAILED DESCRIPTION OF THE EMBODIMENT

Figure 1:
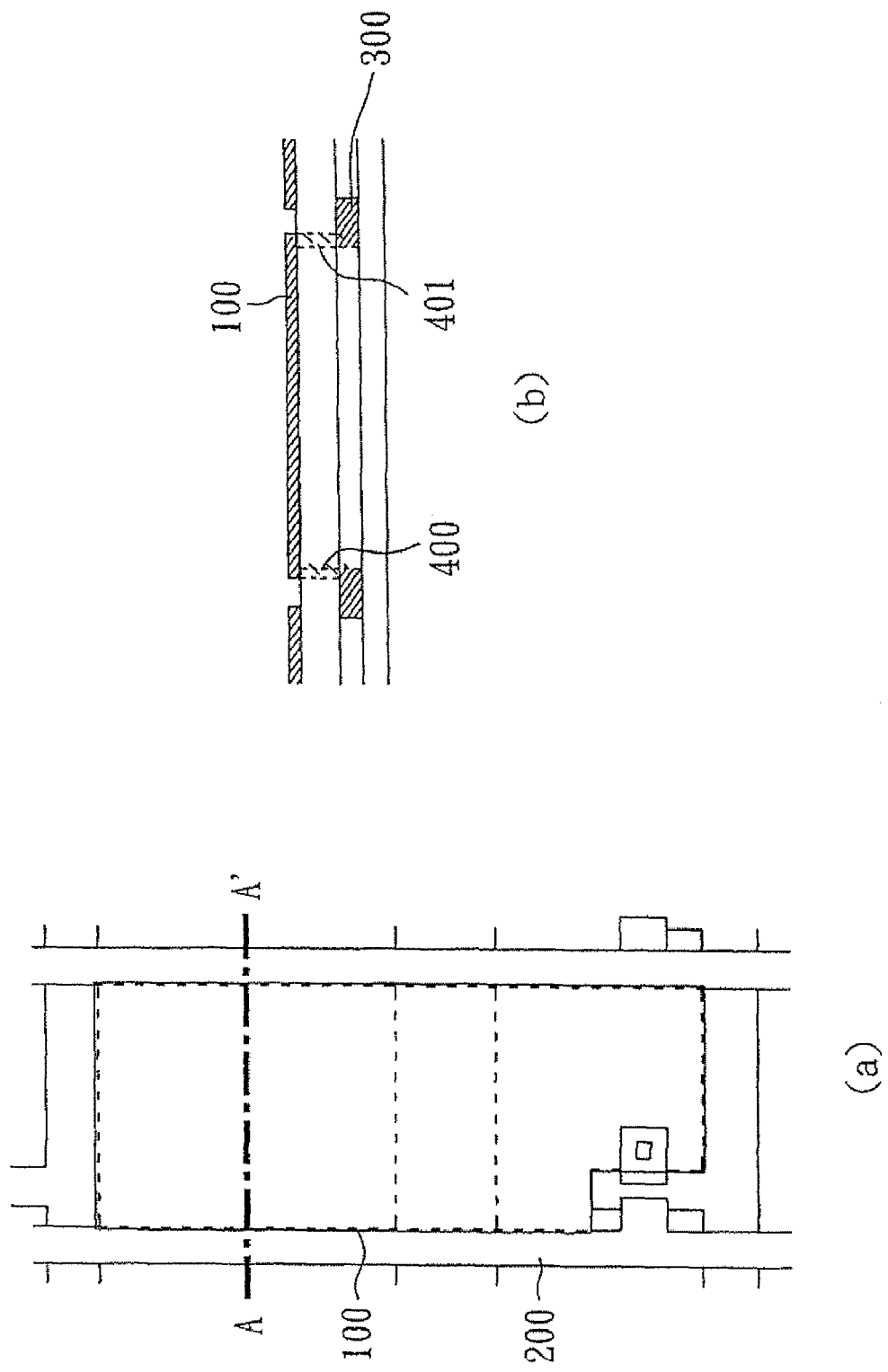
FIG. 1(a) is a top view of the pixel areas of a conventional LCD.
FIG. 1(b) is a cross-section view of the pixel areas of a conventional LCD.
Figure 2:
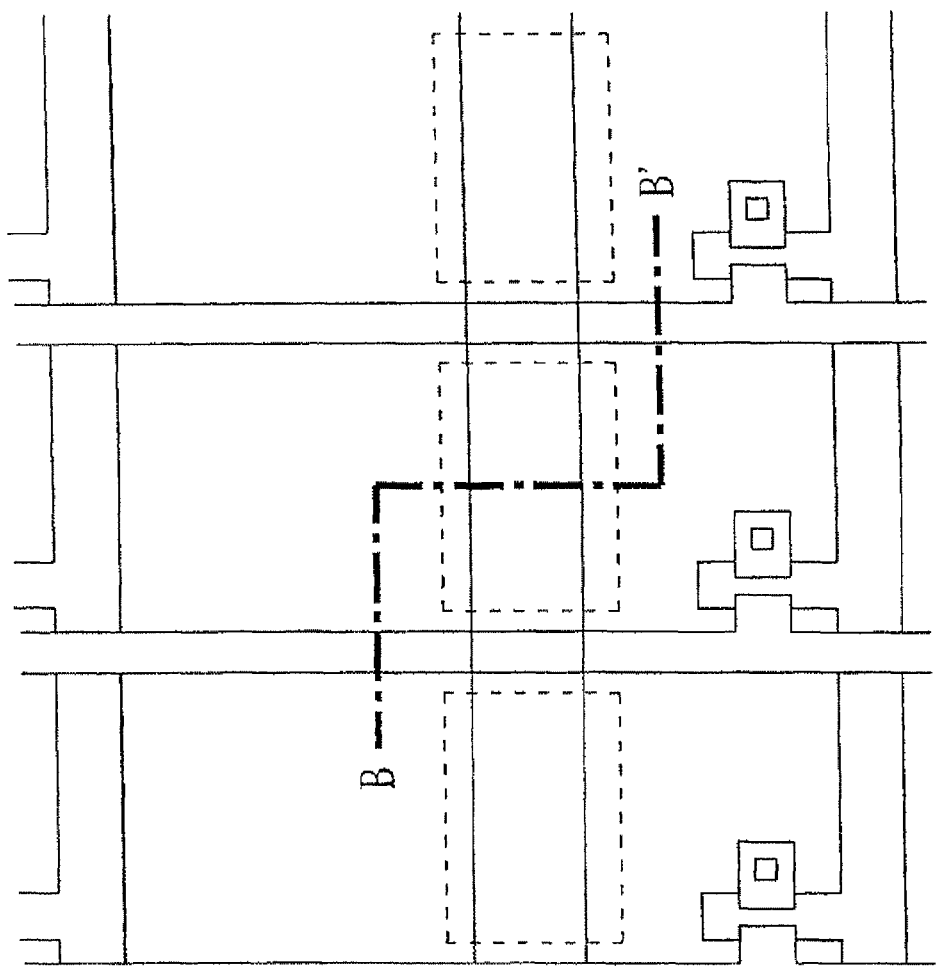
FIG. 2 is a top view of the pixel areas of the present invention.

The method of the present invention is the way of the backside exposure of the lower substrate to have high accuracy of the alignment. However, it can be a problem that pixel electrode area may be cut into two non-conductive areas if non-transparent materials are used for common electrode lines. Hence, various kinds of embodiments in the present invention method are required to explain different objectives. The position of the following profiles is in the section line between B and B' in a planar diagram, FIG. 2.

First Embodiment

Figure 3:
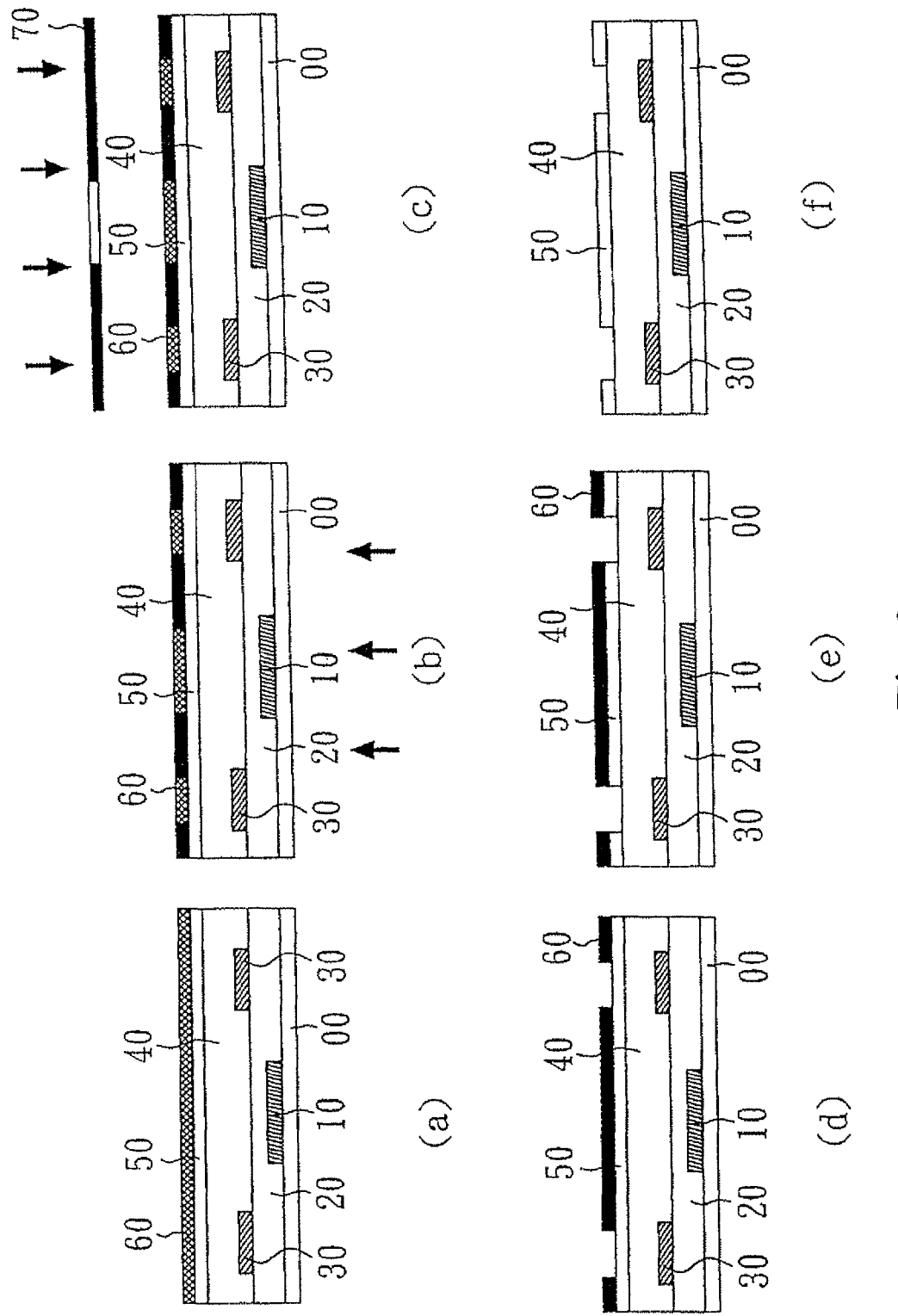
FIGS. 3(a)-(f) show the first embodiment of the present invention.

With reference to FIG. 3(a), a glass substrate 00 is provided. On the substrate 00, a patterned first metal layer 10, a first insulation layer 20, a patterned second metal layer 30, and a second insulation layer 40 are formed in sequence. The first metal layer 10 is covered by the first insulation layer 20, the second metal layer 30 locates on the first insulation layer 20, and the second metal layer 30 is covered by the second insulation layer 40.

The second insulation layer 40 of the present embodiment is a planarizing layer 40. The formed first metal layer 10 is a gate metal layer, or a gate conductive layer.

Then, a transparent electrode layer 50 and a negative photoresist layer 60 are formed over the planarizing layer 40. The formed transparent electrode layer 50 locates between the planarizing layer 40 and the negative photoresist layer 60, as shown in FIG. 3(a).

As the arrow points shown in FIG. 3(b), the substrate 00 is illuminated from the backside thereof. The patterned second metal layer 30 and the patterned first metal layer 10 which are made of non-transparent materials in the present embodiment are functioned as masks to the negative photoresist layer 60. Because the applied photoresist is a negative photoresist in the present embodiment, when part of the photoresist is exposed, the negative photoresist is polymerized to form an insoluble polymer. However, other part of the negative photoresist over the first metal layer 10 may be removed in development since it is not exposed.

In order to remain the part of the photoresist over the first metal layer 10 and the part of the transparent electrode, the next step for exposing the face of the substrate 00 should be processed subsequently. A mask 70 covering the part of the photoresist 60 above the patterned second metal layer 30, as shown in FIG. 3(c), is applied to expose part of the photoresist 60 over the first metal layer 10.

Furthermore, by removing the non-reacted negative photoresist, the patterned photoresist is formed, as shown in FIG. 3(d). Through etching the substrate according to the patterned photoresist, a patterned transparent electrode 50 is formed, as shown in FIG. 3(e). Finally, by way of removing residual photoresist, a patterned transparent electrode 50 over the substrate is formed, as shown in FIG. 3(f).

Second Embodiment

Figure 4:
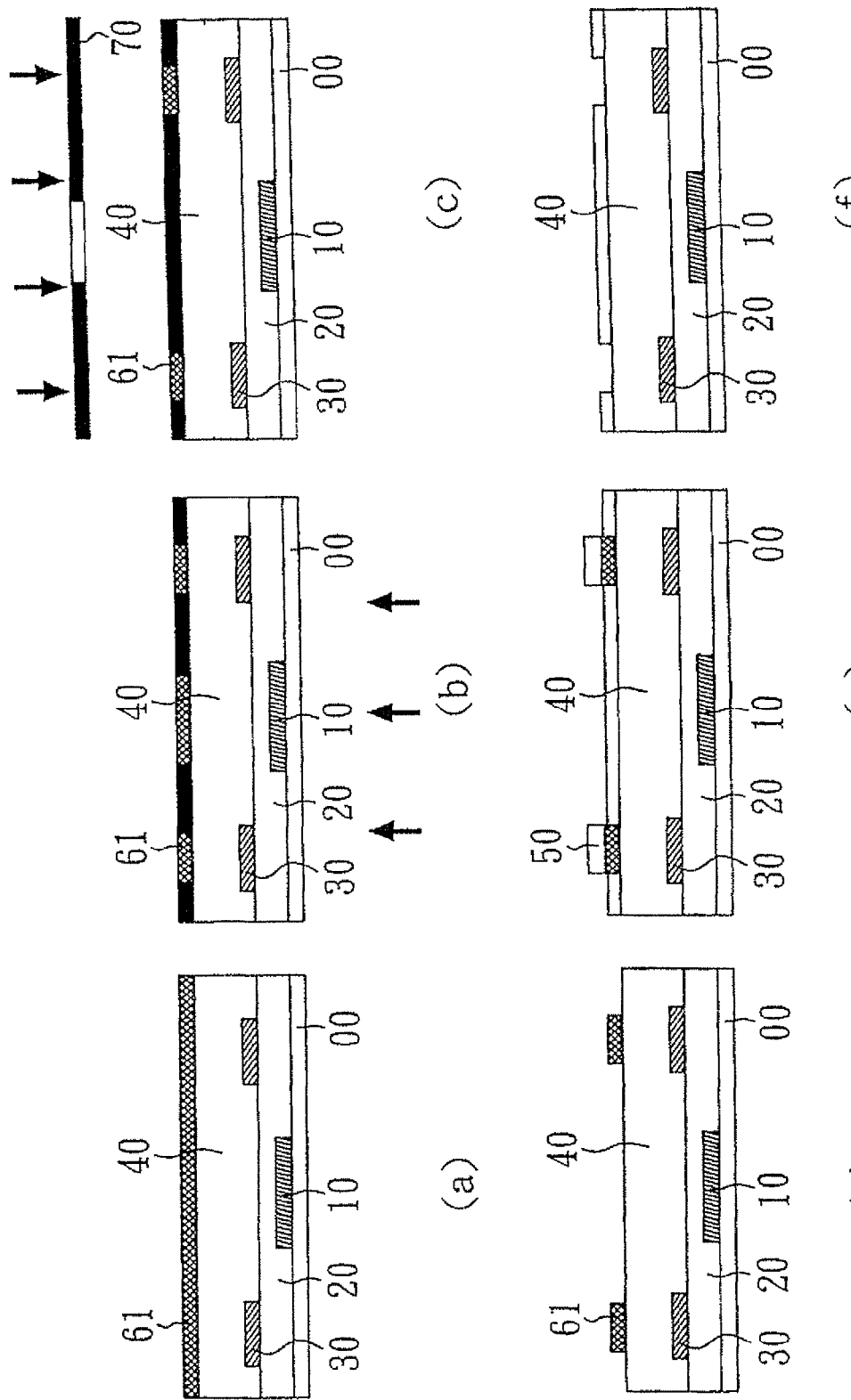
FIGS. 4(a)-(f) show the second embodiment of the present invention.

The preparation of the substrate is similar to that illustrated in the first embodiment. With reference to FIG. 4, a glass substrate 00 is provided first. On the face side of the substrate 00, a patterned first metal layer 10, a first insulation layer 20, a patterned second metal layer 30, and a second insulation layer 40 are formed in sequence. The formed first metal layer 10 is covered by the first insulation layer 20, the second metal layer 30 locates on the first insulation layer 20, and the second metal layer 30 is covered by the second insulation layer 40.

Similar to the device illustrated in the first embodiment, the second insulation layer 40 is a planarizing layer 40. The formed first metal layer 10 is a gate metal layer, or a gate conductive layer.

Then, a positive photoresist layer 61 is coated on the planarizing layer 40 (FIG. 4(a)). As the arrows shown in FIG. 4(b), the light radiated to the substrate 00 is from the backside thereof. The patterned second metal layer 30 and the patterned first metal layer 10 which are made of non-transparent materials are functioned as masks to the positive photoresist layer 61.

Because the photoresist is a positive photoresist in the present embodiment, the exposed part of the photoresist will be removed with developers or strippers. However, since the photoresist over the first metal layer is not exposed thoroughly, the non-exposed part of the positive photoresist over the first metal layer 10 may be remained. The remained positive photoresist has an effect for the formation of the solid transparent electrode layer in next step. In order to remove part of the positive photoresist 61 over the first metal layer 10, in the following step, the substrate 00 is directly exposed from the face side thereof, as shown in FIG. 4(c). Part of the photoresist 61 over the first metal layer 10 is exposed by way of using a mask 71 that covers part of the photoresist 61 over the patterned second metal layer 30.

Through removing the exposed positive photoresist 61, the patterned positive photoresist 61 is formed on the planarizing layer 40 (FIG. 4(d)). On the patterned positive photoresist 61 and the exposed planarizing layer 40, a transparent electrode layer 50 is formed to cover thoroughly (FIG. 4(e)). Finally, through stripping all of the positive photoresist 61, the part of the transparent electrode layer 50 on the positive photoresist 61 can be also removed. The formation of the patterned transparent electrode is completed, as shown in FIG. 4(f).

In the present embodiment, the first metal layer is as well as a gate metal layer or a gate conductive layer.

Third Embodiment

Figure 5:
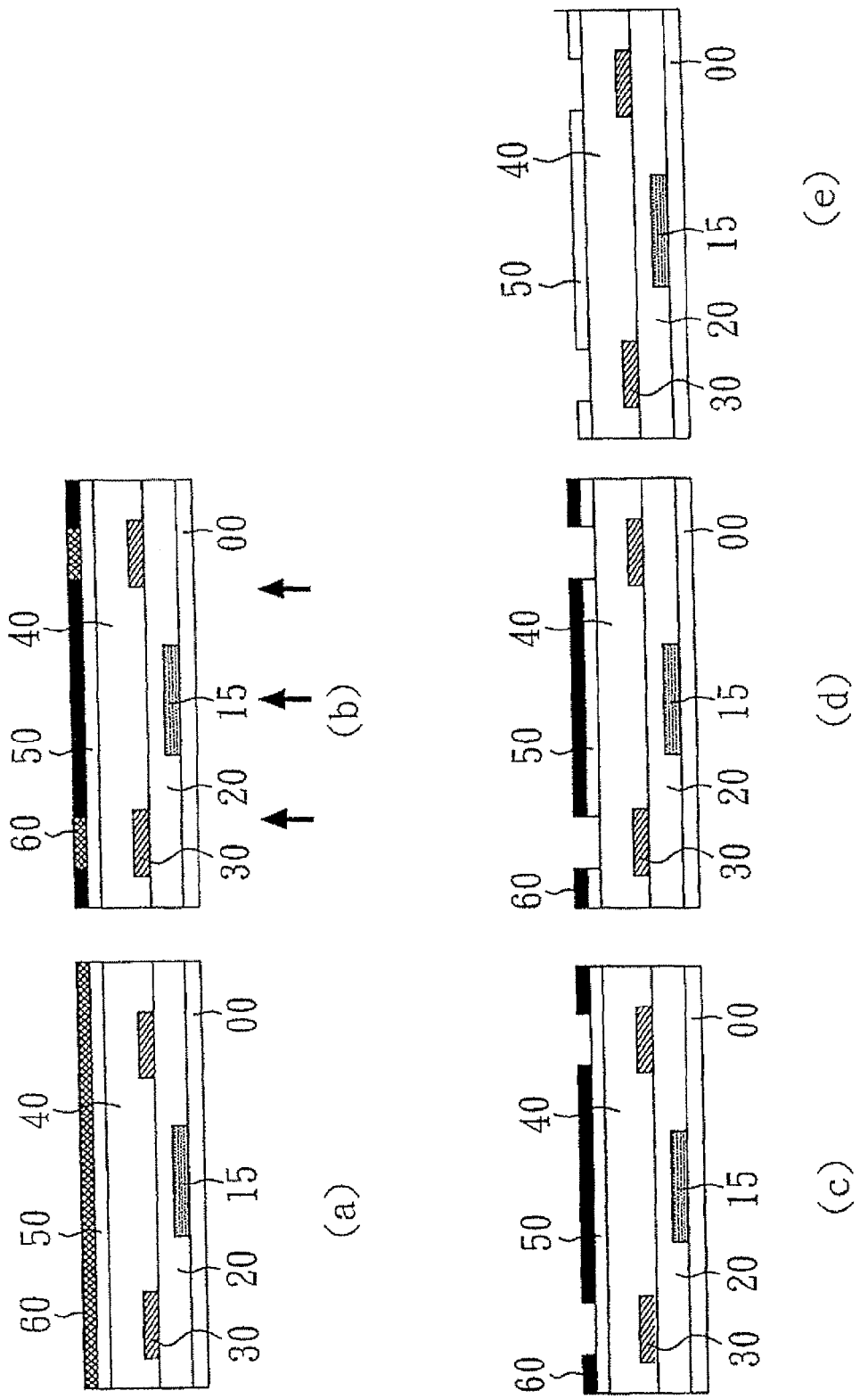
FIGS. 5(a)-(e) show the third embodiment of the present invention.

With reference to FIG. 5(a), a glass substrate 00 is provided. On the face side of the substrate 00, a patterned first transparent electrode layer 15, a first insulation layer 20, a patterned metal layer 30, and a second insulation layer 40 are formed in sequence. The first transparent electrode layer 15 is covered by the first insulation layer 20, the metal layer 30 locates on the first insulation layer 20, and the metal layer 30 is covered by the second insulation layer 40.

Similar to the device illustrated in the first embodiment, the second insulation layer 40 is a planarizing layer 40. Then, a second transparent electrode layer 50 and a negative photoresist layer 60 are formed over the planarizing layer 40. The formed second transparent electrode layer 50 locates between the planarizing layer 40 and the negative photoresist layer 60, as shown in FIG. 5(a).

As the arrow shown in FIG. 5(b), the substrate 00 is exposed from the backside thereof. The patterned non-transparent metal layer 30 and the patterned first transparent electrode layer 15 are functioned as masks to the negative photoresist layer 60. In the present embodiment, when the substrate is illuminated from the backside thereof, part of light passes through the first transparent electrode layer 15 that is made of transparent or semi-transparent material, and is radiated on the negative photoresist 60. The exposed part of the photoresist on the first transparent electrode layer 15 is polymerized and remained by developing.

Furthermore, by removing the non-reacted negative photoresist layer 60, the patterned negative photoresist layer 60 is formed over the planarizing layer 40, as shown in FIG. 5(c). The second transparent electrode layer 50 is etched according to the patterned photoresist 60, as shown in FIG. 5(d). Finally, by way of removing all of the negative photoresist 60, the patterned second transparent electrode 50 is formed, as shown in FIG. 5(e).

Fourth Embodiment

Figure 6:
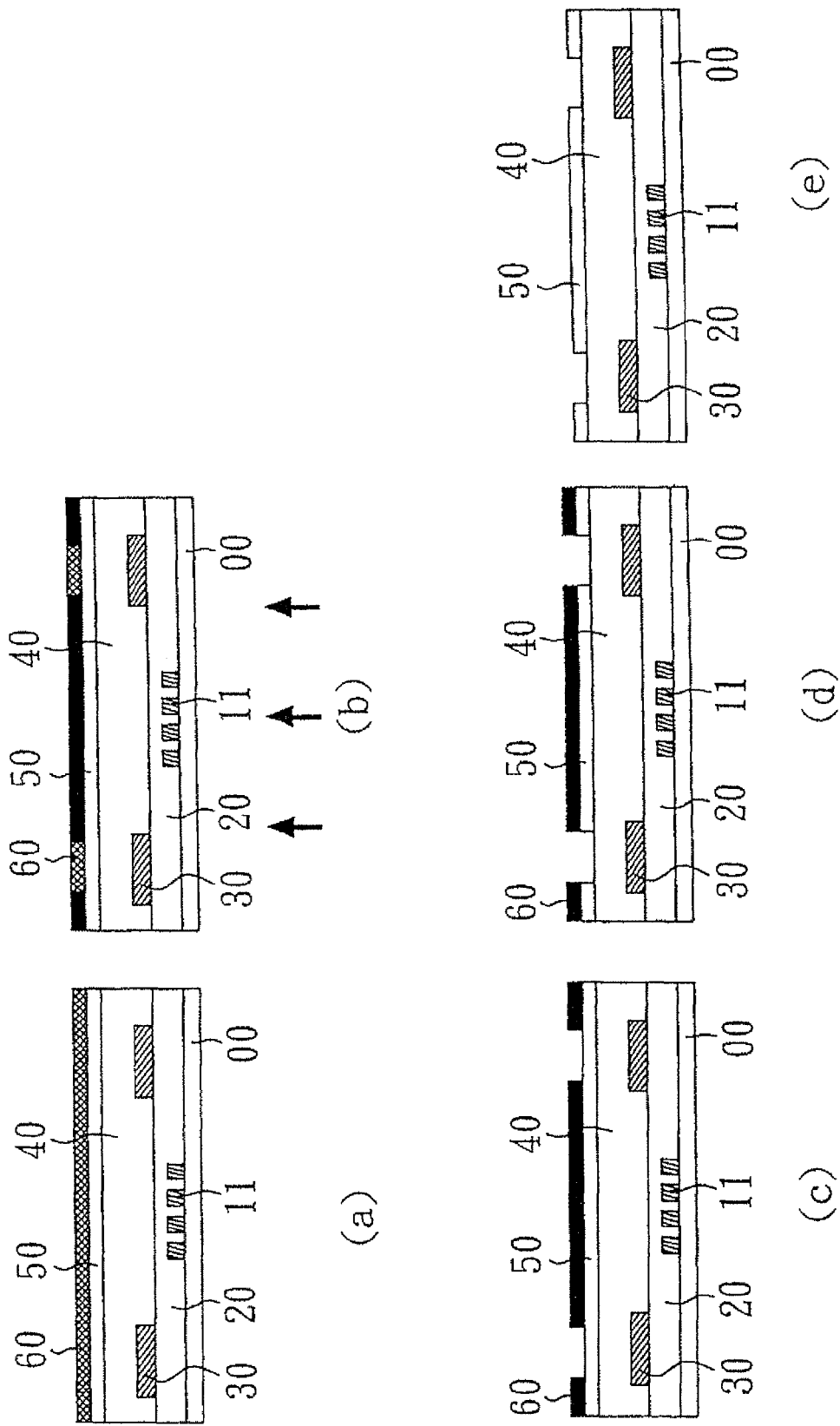
FIGS. 6(a)-(e) show the fourth embodiment of the present invention.

The manufacture for the substrate is similar to what illustrated in the first embodiment. With reference to FIG. 6, a glass substrate 00 is provided first. On the face side of the substrate 00, a patterned first conductive layer 11, a first insulation layer 20, a patterned metal layer 30, and a second insulation layer 40 are formed in sequence. The formed first conducive layer 11 is covered by the first insulation layer 20, the metal layer 30 locates on the first insulation layer 20, and the metal layer 30 is covered by the second insulation layer 40.

Similar to the device illustrated in the first embodiment, the second insulation layer 40 is a planarizing layer 40. In the present embodiment, the first conductive layer 11 is made of semi-transparent or non-transparent material, and is a form of a grating.

Then, a transparent electrode layer 50 and a negative photoresist layer 60 are formed or coated over the planarizing layer 40. The transparent electrode layer 50 locates between the planarizing layer 40 and the negative photoresist layer 60, as shown in FIG. 6(a).

As the arrow shown in FIG. 6(b), the substrate 00 is exposed from the backside thereof. The patterned non-transparent metal layer 30 and the first grating conductive layer 11 are functioned as masks to the negative photoresist layer 60. In the present embodiment, when the substrate is illuminated from the backside thereof, part of light passes through the first grating conductive layer 11 and is radiated on the negative photoresist 60. The photoresist over the first conductive layer 11 is remained, and benefits to form a complete transparent electrode.

Then, by removing the non-reacted negative photoresist 60, over the planarizing layer 40, the patterned negative photoresist 60 is formed, as shown in FIG. 6(c).

According to the patterned photoresist 60, the second transparent electrode 50 is etched, as shown in FIG. 6(d). Finally, by removing all of the negative photoresist 60, the second patterned transparent electrode 50 is completed, as shown in FIG. 6(e).

Although the present invention has been explained in relation to its embodiments, it is to be understood that many other possible modifications and variations can be made without departing from the scope of the invention as hereinafter claimed.

What is claimed is:

1. A method for manufacturing a lower substrate of a liquid crystal display device, comprising:
   (a) forming a patterned first transparent electrode layer, a first insulation layer, a patterned metal layer, and a second insulation layer over a first surface of a substrate, wherein the first transparent layer is covered by the first insulation layer, the patterned metal layer locates on the first insulation layer, and the patterned metal layer is covered by the second insulation layer;
   (b) forming a second transparent electrode layer and a negative photoresist layer over the second insulation layer, wherein the second transparent electrode layer locates between the second insulation layer and the negative photoresist;
   (c) exposing the substrate from a second surface of the substrate, wherein the second surface is opposing to the first surface of the substrate;

(d) removing the non-reacted negative photoresist; and (e) forming a patterned second transparent electrode.

2. The method of claim 1, further comprising removing all the negative photoresist after step (d).

3. The method of claim 1, wherein the second insulation layer is planarizing layer.

4. The method of claim 1, wherein the second transparent electrode layer in step (b) is formed through sputtering.

5. The method of claim 1, wherein the first transparent electrode and the second transparent electrode are made of indium tin oxide (ITO) or indium zirconium oxide (IZO).

6. The method of claim 1, wherein the patterned second transparent electrode in step (e) is formed through etching.

* * * * *